(12) United States Patent
Krpo et al.

(10) Patent No.: US 10,994,636 B2
(45) Date of Patent: May 4, 2021

(54) SLIDING DEVICE FOR A VEHICLE SEAT PROVIDED WITH AN IMPROVED RAIL DESIGN

(71) Applicant: MARTUR ITALY S.R.L., Milan (IT)

(72) Inventors: Azra Krpo, Grugliasco (IT); Can Üstünberk, Grugliasco (IT)

(73) Assignee: MARTUR ITALY S.R.L., Milan (IT)

( * ) Notice: Subject to any disclaimer, the term of this patent is extended or adjusted under 35 U.S.C. 154(b) by 0 days.

(21) Appl. No.: 16/758,524

(22) PCT Filed: Oct. 30, 2019

(86) PCT No.: PCT/IB2019/059304
§ 371 (c)(1),
(2) Date: Apr. 23, 2020

(87) PCT Pub. No.: WO2020/144504
PCT Pub. Date: Jul. 16, 2020

(65) Prior Publication Data
US 2020/0391619 A1    Dec. 17, 2020

(30) Foreign Application Priority Data
Jan. 9, 2019   (IT) ..................... 102019000000313

(51) Int. Cl.
*B60N 2/00* (2006.01)
*B60N 2/07* (2006.01)

(52) U.S. Cl.
CPC .......... *B60N 2/0715* (2013.01); *B60N 2/073* (2013.01); *B60N 2/0727* (2013.01)

(58) Field of Classification Search
CPC ........ B60N 2/0715; B60N 2/06; B60N 2/067; B60N 2/07; B60N 2/0702
(Continued)

(56) References Cited

U.S. PATENT DOCUMENTS 5,692,839 A   12/1997  Rohee et al.
5,806,825 A    9/1998  Couasnon
(Continued)

FOREIGN PATENT DOCUMENTS

CN   202608593 U   12/2012
CN   107878264 A    4/2018
(Continued)

OTHER PUBLICATIONS

International Search Report and Written Opinion of the International Searching Authority dated Jan. 28, 2020 for International Patent Application No. PCT/IB2019/059304.

*Primary Examiner* — Steven M Marsh
(74) *Attorney, Agent, or Firm* — Howson & Howson LLP

(57) ABSTRACT

The present invention relates to a sliding device (100) for a vehicle seat, comprising a pair sliding tracks (10), each including a lower rail (20) and an upper rail (30), which allow to obtain an improved stability and to reduce the sliding efforts when the upper rails slide relative to the lower rails. Each upper rail is constrained to a respective lower rail and is free to slide relative thereto, balls (70) are arranged between said upper rail and said lower rail, and said upper and lower rails are shaped so as to define a lower and an upper ball guides (72, 74) on each side thereof. The design of said upper and lower rails at said lower and upper ball guides (72, 74) is such that efforts during relative sliding movements of the rails are reduced, while enhancing stability of the rails and preventing deformations thereof.

14 Claims, 7 Drawing Sheets

(58) Field of Classification Search
USPC .................................. 248/424, 429, 430
See application file for complete search history.

(56) References Cited

U.S. PATENT DOCUMENTS

| | | | |
|---|---|---|---|
| 5,984,254 A | 11/1999 | Baloche et al. | |
| 6,427,962 B1* | 8/2002 | Rohee | B60N 2/0705 |
| | | | 248/424 |
| 8,398,045 B2 | 3/2013 | Kimura | |
| 9,751,431 B2* | 9/2017 | Walter | B60N 2/0705 |
| 10,434,902 B2 | 10/2019 | Hayashi | |
| 2004/0056165 A1* | 3/2004 | Ganot | B60N 2/0715 |
| | | | 248/430 |
| 2007/0069099 A1 | 3/2007 | Kohmura | |
| 2012/0199719 A1* | 8/2012 | Yamada | B60N 2/0705 |
| | | | 248/430 |
| 2013/0193730 A1* | 8/2013 | Walter | B60N 2/12 |
| | | | 297/341 |
| 2013/0341479 A1* | 12/2013 | Yamada | F16C 33/412 |
| | | | 248/430 |
| 2014/0263921 A1* | 9/2014 | Dick | B60N 2/0705 |
| | | | 248/430 |
| 2014/0353454 A1* | 12/2014 | Yamada | B60N 2/0818 |
| | | | 248/430 |
| 2015/0291062 A1 | 10/2015 | Yamada et al. | |
| 2018/0222352 A1 | 8/2018 | Flick et al. | |
| 2018/0257515 A1 | 9/2018 | Taniguchi | |
| 2019/0389332 A1 | 12/2019 | Flick et al. | |

FOREIGN PATENT DOCUMENTS

| | | |
|---|---|---|
| DE | 100 39 510 A1 | 2/2002 |
| DE | 100 39 511 A1 | 2/2002 |
| DE | 10 2016 225 818 A1 | 3/2018 |
| WO | 2015/188746 A1 | 12/2015 |

* cited by examiner

SLIDING DEVICE FOR A VEHICLE SEAT PROVIDED WITH AN IMPROVED RAIL DESIGN

TECHNICAL FIELD

The present invention relates to a sliding device for a vehicle seat.

More particularly, the present invention relates to a sliding device comprising a pair sliding tracks, each comprising a lower rail and an upper rail, which rails have an improved design, allowing to obtain an improved stability and to reduce the sliding efforts when the upper rails slide relative to the lower rails.

BACKGROUND ART

Vehicle seats generally have a sliding function for pushing or pulling the seat cushion in a forward or backward direction, a height adjustment function for adjusting the height of the seat cushion and a reclining function for adjusting the inclination of the seat backrest relative to the seat cushion.

The aforesaid sliding function is generally implemented by a sliding device which comprises a pair of parallel tracks, each of which comprises a lower rail attached to the vehicle floor and an upper rail attached to the vehicle seat, the upper rail being constrained to the lower rail, but being able to slide relative to said lower rail.

Each track of the sliding device further comprises a latch for allowing/preventing movement of the upper rail relative to the lower rail. Such latch is normally in a locking position, in which it prevents the upper rail from sliding with respect to the lower rail, thus avoiding accidental displacements of the seat with respect to the vehicle floor. The sliding device is further provided with a releasing member which can be used by a user for moving the latches of the tracks to an unlocking position, in which the upper rail is free to move relative to the lower rail, so that the position of the seat with respect to the vehicle floor can be adjusted. Such releasing member can be made, for instance, as a "U"-shaped handle having two substantially parallel arms, the end portions of which are configured to simultaneously act upon respective latches of the tracks of the sliding device for driving them to their unlocking position.

Such a sliding device is disclosed, for instance, in patent application EP 752 338.

In order to constrain the upper rail to the respective lower rail, sliding device are known in which the lower rail has as an upwardly oriented "U" shaped cross-section and the upper rail has a downwardly oriented "U" shaped cross-section and the upper and lower rails have respective flanges that cooperate for constraining the upper rail to the lower rail.

In order to allow and enhance a sliding movement of the upper rail relative to said lower rail, balls are provided between the upper and lower rails, which rails are shaped so as to define guides for said balls.

Patent applications US 2015/0291062, US 2018/0257515, US 2018/0222352, US 2007/0069099 and JP 2018-043717 all disclose sliding devices having the structure described above.

However, the sliding devices of disclosed in the aforesaid documents are not free from drawbacks.

More particularly, in said sliding devices the design of the lower and upper rails is not optimized, namely with respect to the stability of the rail coupling and the efforts during sliding movements of the upper rail relative to the lower rail.

Therefore, the main object of the present invention is to provide a sliding device with sliding tracks comprising lower and upper rails having an improved design, allowing to improve the stability of the sliding device and to reduce the sliding efforts.

A further object of the present invention is to provide a sliding device with a compact and cost-effective construction.

These and other objects are achieved by a sliding device as claimed in the appended claims.

SUMMARY OF INVENTION

According to a first aspect of the invention, the sliding device comprises a pair of parallel tracks, each of which comprises a lower rail, an upper rail slidably constrained to said lower rail and a latch for selectively allowing/preventing movement of said upper rail relative to said lower rail, wherein each lower rail has a cross-section having the shape of an upwardly oriented "U" and comprises a lower wall and a pair of parallel, upwardly oriented vertical walls, ending with respective inwardly and downwardly bent flanges, wherein each upper rail has a cross-section having the shape of a downwardly oriented "U" and comprises an upper wall and a pair of parallel, downwardly oriented vertical walls, ending with respective outwardly and upwardly bent flanges, the outwardly and upwardly bent flanges of the upper rail being engaged with the inwardly and downwardly bent flanges of the respective lower rail, wherein on each side of said rails a lower ball guide and an upper ball guide are formed by said lower and upper rails, wherein the lower ball guide is defined by a first lower ball guide portion formed by the lower rail, at the bending joining said lower wall to the respective upwardly oriented vertical wall, and by a second lower ball guide portion formed by the outwardly and upwardly bent flange of the upper rail and wherein the upper ball guide is formed by a first upper ball guide portion formed by the lower rail, at the bending joining the upwardly oriented vertical wall to the respective inwardly and downwardly bent flange, and by a second upper ball guide portion formed by the outwardly and upwardly bent flange of the upper rail.

According to the invention, the outwardly and upwardly bent flange of the upper rail is shaped in such a way that said second lower ball guide portion comprises a straight section and a curved section and said second upper ball guide portion also comprises a straight section and a curved section.

According to the invention, during normal operation, the balls in the lower ball guide contact the second lower ball guide portion at the straight section thereof, while they are spaced apart from the curved section of said second lower ball guide portion; analogously, the balls in the upper ball guide contact the second upper ball guide portion at the straight section thereof, while they are spaced apart from the curved section of said second upper ball guide portion.

Thanks to the design of the invention, the second lower ball guide portion is tangentially in contact with the balls received in the lower ball guide and the second upper ball guide portion is tangentially in contact with the balls received in the upper ball guide.

Therefore, the contact area between the second lower ball guide portion and the second upper ball guide portion and the respective balls is minimized, which allows to reduce friction and, as a result, the efforts during sliding movements of the upper rail relative to the lower rail.

In case of loads, the upper and lower rails are pressed against each other and slightly elastically deformed, so that the curved section of the second lower ball guide portion comes into contact with the balls received in the lower ball guide and the curved section of the second upper ball guide portion comes into contact with the balls received in the upper ball guide.

When the curved sections of the second lower ball guide portion and of the second upper ball guide portion come into contact with the respective balls, further deformation of the rails is prevented.

According to a preferred embodiment of the invention, the straight section of the second lower ball guide portion is above the curved section of said second lower ball guide portion and the straight section of the second upper ball guide portion is below the curved section of said second upper ball guide portion.

According to a preferred embodiment of the invention, the curvature radius at the bending of the lower rail joining its lower wall to the respective upwardly oriented vertical wall (i.e. the curvature radius of the first lower ball guide portion) is substantially equal to the radius of the balls received in the lower ball guide and the curvature radius of the curved section of the second lower ball guide portion is larger than the radius of said balls. Analogously, the curvature radius at the bending of the lower rail joining its upwardly oriented vertical wall to the respective inwardly and downwardly bent flanges (i.e. the curvature radius of the first upper ball guide portion) is substantially equal to the radius of the balls received in the lower ball guide and the curvature radius of the curved section of the second upper ball guide portion is larger than the radius of said balls.

According to a preferred embodiment of the invention, the straight section of the second lower ball guide portion is arranged so as to form an angle with the vertical wall of the lower rail that is selected for keeping the balls received in the lower ball guide in an optimum position and for absorbing possible dimensional variations. Analogously, the straight section of the second upper ball guide portion is arranged so as to form an angle with the vertical wall of the lower rail that is selected for keeping the balls received in the upper ball guide in an optimum position and for absorbing possible dimensional variations.

According to a second aspect of the invention, ball stopping elements are provided for limiting the movements of the balls along the respective ball guides.

According to the invention, for each ball guide a first ball stopping element is provided by inwardly bending the lower rail wall at the first lower/upper ball guide portion at selected locations along the longitudinal axis of said lower rail.

According to the invention, for each ball guide a second ball stopping element is provided by providing a tab protruding from the upper rail wall at the second lower/upper ball guide portion and towards the center of the respective ball guide.

Advantageously, the first and second ball stopping elements of the invention are easy and inexpensive to manufacture, their manufacturing does not require the use of complex tools and large tolerances are allowed.

According to a third aspect of the invention, end stops are provided for limiting the relative movement of the upper rail relative to the respective lower rail.

According to the invention, on each side of the lower and upper rails a first end stop is provided by cutting and bending a first flap from the wall of the lower rail and a second end stop is provided by cutting and bending a second flap from the wall of the upper rail, the first and second end stops being arranged so that they abut against each other and prevent further movement of the upper rail relative to the lower rail.

Advantageously, according to the invention the first and second end stops are shaped as flared flaps (i.e. they have a trapezoidal shape, with the longer base far from the respective rail wall).

The flared shape of the first and second end stops ensures a positive engagement between said first and second end stops, thus providing a very strong engagement.

According to a fourth aspect of the invention, a reinforcement block is fitted inside the downwardly oriented opening of each upper rail for preventing bowing and peeling thereof and the downwardly oriented vertical walls of the upper rail are correspondingly provided with one or more inwardly protruding lugs for precisely and firmly fastening said reinforcement block to the respective upper rail.

Advantageously, said lugs allow to easily assemble the reinforcement block with the respective upper rail.

BRIEF DESCRIPTION OF DRAWINGS

Further features and advantages of the invention will become more evident from the detailed description of a preferred embodiment thereof, given by way of non-limiting example, with reference to the attached drawing, in which:

FIG. 1b is an exploded view of the sliding device of FIG. 1a;

FIG. 2b is an enlarged view of detail B2 of FIG. 2a;

FIG. 3b is an enlarged view of detail B3 of FIG. 3a;

FIG. 4a is a perspective view of a portion of a track of the sliding device of FIG. 1a;

FIG. 4b is an enlarged view of detail B4 of FIG. 4a;

FIG. 4c shows the end stops provided in the lower rail of the sliding track of FIG. 4a;

FIGS. 4d show the end stops provided in the upper rail of the sliding track of FIG. 4a;

FIG. 5b is a cross-sectional view of the track portion of FIG. 5a.

DESCRIPTION OF EMBODIMENTS

Figure 1A:
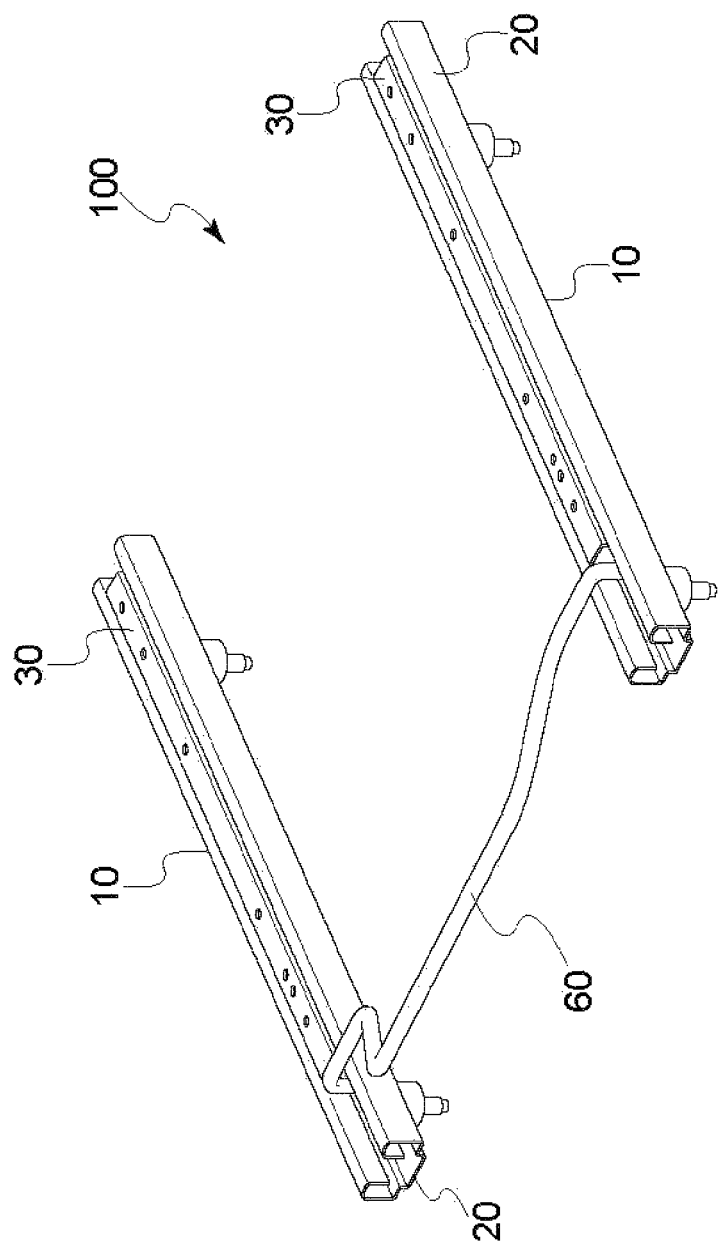
FIG. 1a is a perspective view of a sliding device according to the invention.
Figure 1B:
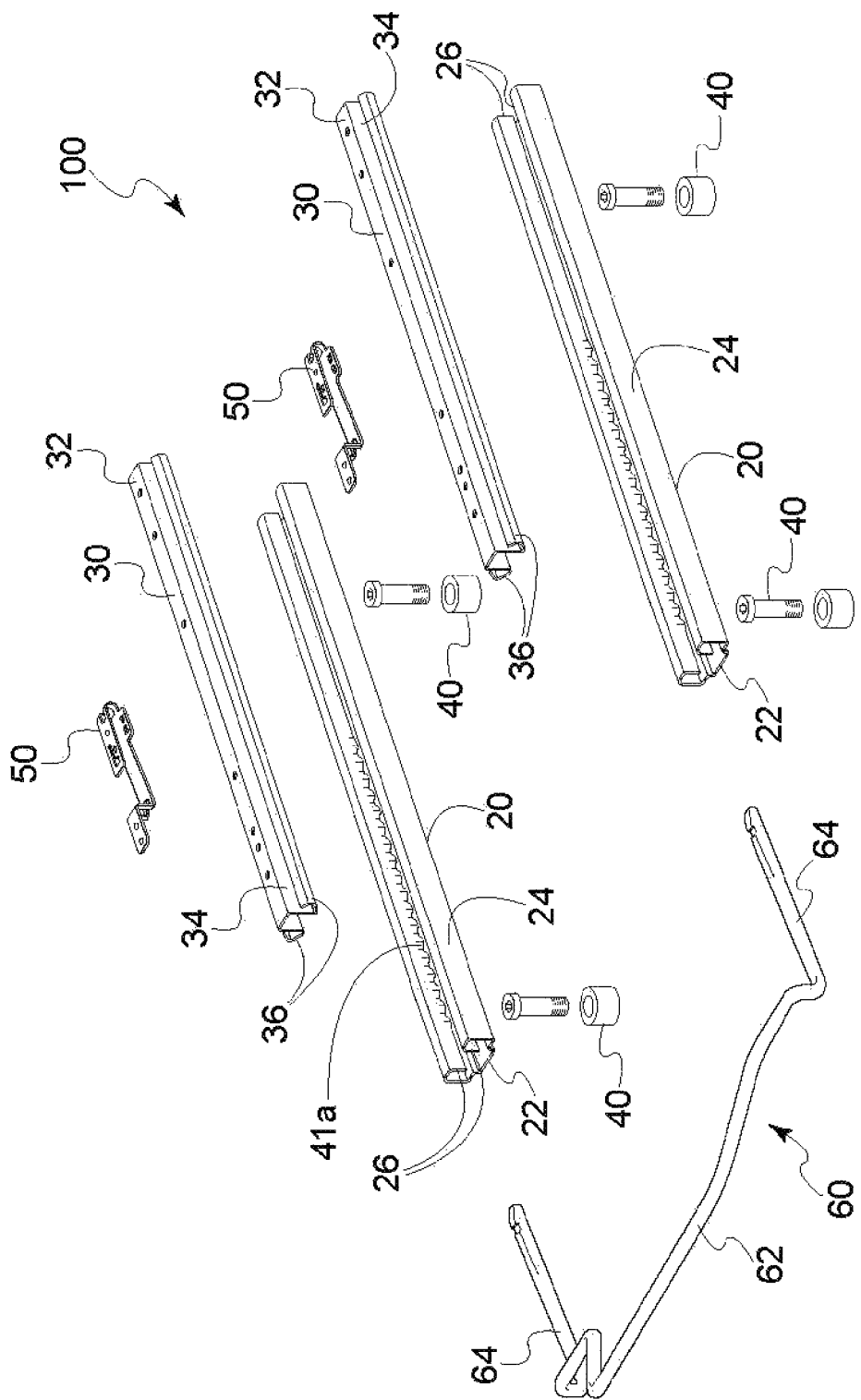

With reference to FIGS. 1a and 1b, a sliding device 100 according to the invention is schematically shown.

In a per se known manner, the sliding device 100 comprises a pair of parallel tracks 10 each comprising a lower rail 20, intended to be attached to the vehicle floor (for instance by threaded fasteners 40), and an upper rail 30, intended to be attached to the frame of a vehicle seat.

As will be disclosed in detail in the following description, each upper rail 30 is constrained to the respective lower rail 20, but it can slide relative thereto.

In order to selectively allow/prevent a relative sliding movement between the upper rails and the lower rails, each track 10 is provided with a latch 50, which is received in the track, between the lower rail and the upper rail. Under normal conditions, the latches 50 are in their locking position, in which they prevent the upper rails from sliding relative to the lower rails.

In order to allow a user to adjust the position of the seat relative to the vehicle floor, the sliding device 100 further comprises a releasing member 60, arranged for driving the latches 50 to an unlocking position, in which they allow the upper rails to slide relative to the lower rails. In the shown embodiment, the releasing member is made as a "U"-shaped releasing handle 60 comprising a middle gripping portion 62 and two substantially parallel arms 64, the end portions of which are arranged to drive the respective latches 50 to their unlocking position.

Figure 2A:
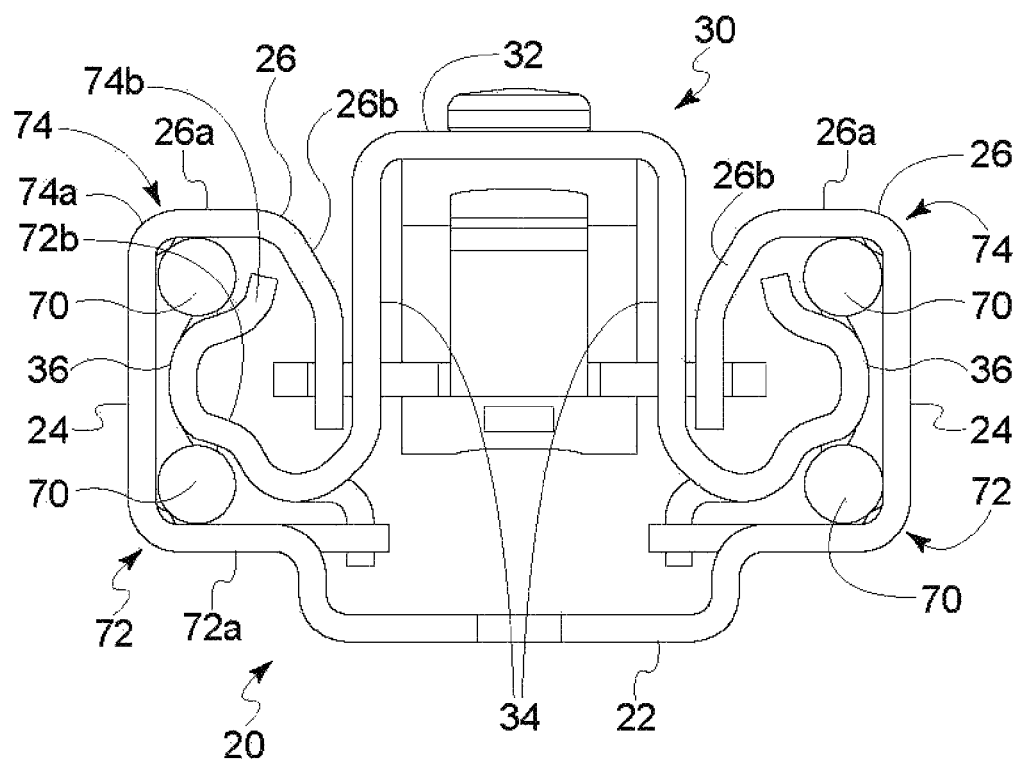
FIG. 2a is a cross-sectional view of the sliding device of FIG. 1a at a first longitudinal position.

As better shown in FIG. 2a, each lower rail 20 has a cross-section having the shape of an upwardly oriented "U" and comprises a lower wall 22 and a pair of parallel, upwardly oriented vertical walls 24, ending with respective inwardly and downwardly bent flanges 26; namely, each flange 26 of the lower rail 20 has a first, inwardly oriented portion 26a departing from the upper end of the respective upwardly oriented vertical wall 24, and a second, downwardly oriented portion 26b extending from said first, inwardly oriented portion 26a.

Correspondingly, each upper rail 30 has a cross-section having the shape of a downwardly oriented "U" and comprises an upper wall 32 and a pair of parallel, downwardly oriented vertical walls 34, ending with respective outwardly and upwardly bent flanges 36.

The outwardly and upwardly bent flanges 36 of the upper rail 30 may become engaged under the inwardly and downwardly bent flanges 26 of the respective lower rail 20 thus constraining said upper rail to said lower rail, while allowing a sliding movement of said upper rail relative to said lower rail.

In order to enhance such sliding movement, balls 70 are arranged between said lower and upper rails.

To this purpose on each side of said rails a lower ball guide 72 and an upper ball guide 74 are formed by said lower and upper rails as follows:
the lower ball guide 72 is defined by a first lower ball guide portion 72a formed by the lower rail, at the bending joining said lower wall 22 to the respective upwardly oriented vertical wall 24, and by a second lower ball guide portion 72b formed by the outwardly and upwardly bent flange 36 of the upper rail; and
the upper ball guide 74 is formed by a first upper ball guide portion 74a formed by the lower rail, at the bending joining the upwardly oriented vertical wall 24 to the respective inwardly and downwardly bent flange 26, and by a second upper ball guide portion 74b formed by the outwardly and upwardly bent flange 36 of the upper rail.

Figure 2B:
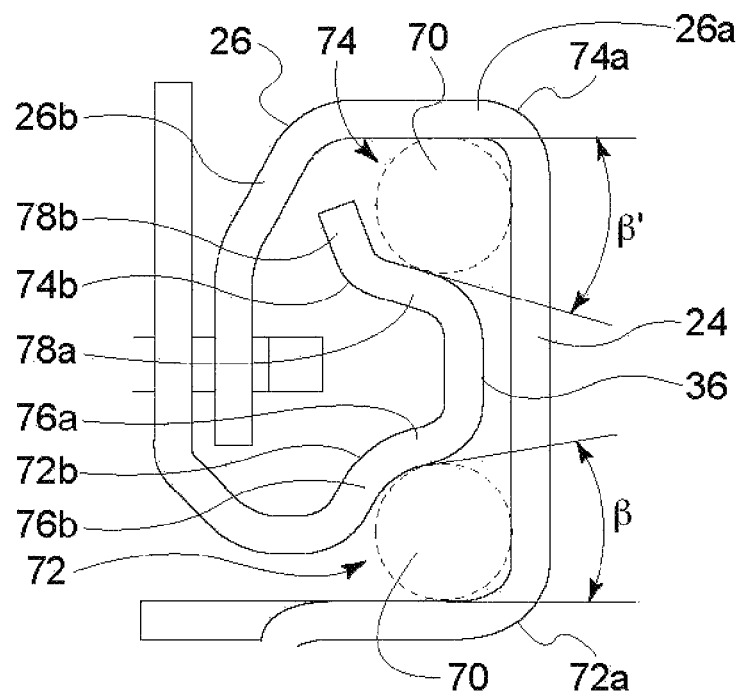

As better shown in FIG. 2b, according to the invention, the outwardly and upwardly bent flange 36 of the upper rail 30 is shaped in such a way that said second lower ball guide portion 72b comprises a straight section 76a and a curved section 76b and said second upper ball guide portion 74b also comprises a straight section 78a and a curved section 78b.

During normal operation, the balls 70 in the lower ball guide 72 contact the second lower ball guide portion 72b at the straight section 76a, only, while they are spaced apart from the curved section 76b of said second lower ball guide portion 72b. Analogously, the balls in the upper ball guide 74 contact the second upper ball guide portion 74b at the straight section 78a only, while they are spaced apart from the curved section 78b of said second upper ball guide portion 74b.

As a result, the contact area between the second lower/upper ball guide portions 72b, 74b and the respective balls 70 is minimized, which allows to reduce friction and, as a result, minimize efforts during sliding movements of the upper rail 30 relative to the lower rail 20.

In case of heavy loads, the upper and lower rails are pressed against each other and slightly elastically deformed, so that the curved section 76b of the second lower ball guide portion 72b comes into contact with the balls received in the lower ball guide 72 and the curved section 78b of the second upper ball guide portion 74b comes into contact with the balls received in the upper ball guide 74.

When the curved sections 76b, 78b of the second lower/upper ball guide portions 72b, 74b come into contact with the respective balls 70, further deformation of the rails is prevented, so that high stability of the construction is guaranteed.

According to the shown embodiment of the invention, the straight section 76a of the second lower ball guide portion 72b is above the curved section 76b of said second lower ball guide portion and the straight section 78a of the second upper ball guide portion 74b is below the curved section 78b of said second upper ball guide portion.

According to a preferred embodiment of the invention, the curvature radius of the first lower ball guide portion 72a is substantially equal to the radius of the balls 70 received in the lower ball guide 72 and the curvature radius of the curved section 76b of the second lower ball guide portion 72b is larger than the radius of said balls.

Analogously, the curvature radius of the first upper ball guide portion 74a is substantially equal to the radius of the balls 70 received in the upper ball guide 74 and the curvature radius of the curved section 78b of the second upper ball guide portion 74b is larger than the radius of said balls.

It is to be noted, in this respect, that the balls received in the lower ball guide 72 may have a radius different from the radius of the balls received in the upper ball guide 74, or—as an alternative—all the balls 70 may have the same radius.

The straight section 76a of the second lower ball guide portion 72b is preferably arranged so as to form an angle β with the flange 26 of the lower rail 20, namely with the first, inwardly oriented portion 26a of said flange, that is selected for keeping the balls received in the lower ball guide in an optimum position and for absorbing possible dimensional variations. Analogously, the straight section 78a of the second upper ball guide portion is arranged so as to form an angle β' with the flange 26 of the lower rail 20, namely with the first, inwardly oriented portion 26a of said flange, that is selected for keeping the balls received in the upper ball guide in an optimum position and for absorbing possible dimensional variations. Angles β and β' can be equal to each other or different from each other. In the shown embodiment, these angles β and β' are substantially equal to each other and they are selected in the range from 20° and 40°.

Figure 3A:
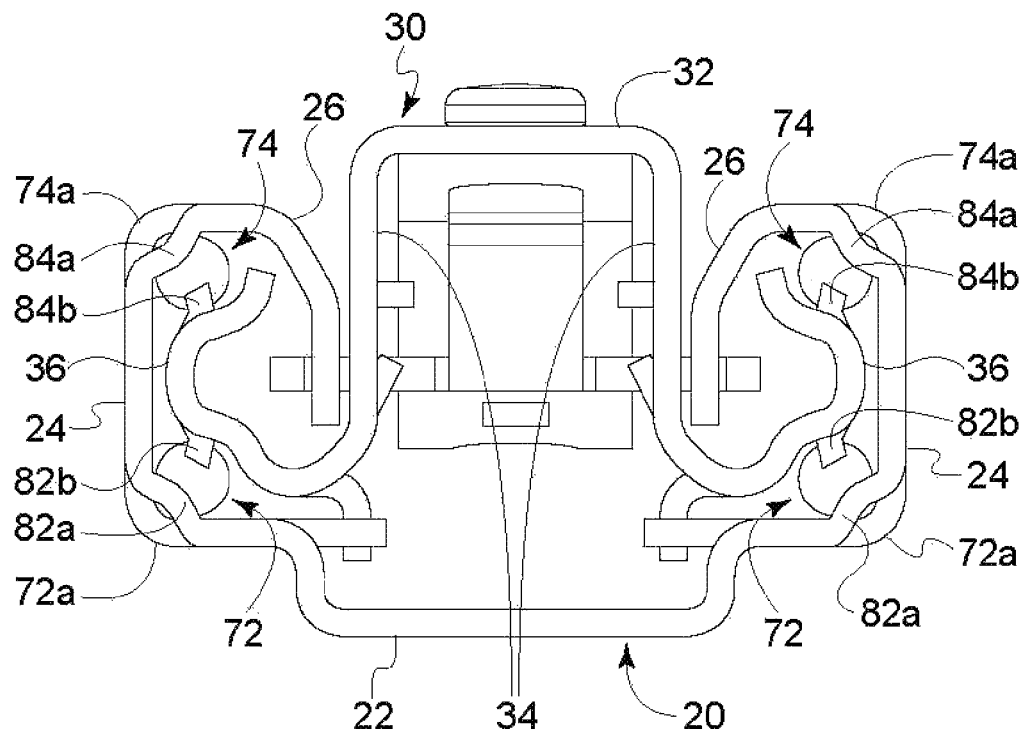
FIG. 3a is a cross-sectional view of the sliding device of FIG. 1a at a second longitudinal position.
Figure 3B:
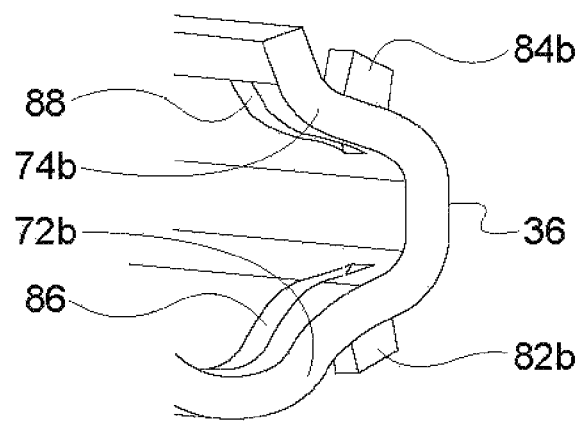

As shown in FIGS. 3a and 3b, ball stopping elements 82a, 82b, 84a, 84b are provided for limiting the movements of the balls along the respective ball guides 72, 74.

According to the invention, for each lower ball guide 72 a first ball stopping element 82a is provided by inwardly bending the lower rail wall at the first lower ball guide portion 72a at selected locations along the longitudinal axis of said lower rail. Analogously, for each upper ball guide 74 a first ball stopping element 84a is provided by inwardly bending the lower rail wall at the first upper ball guide portion 74*a* at selected locations along the longitudinal axis of said lower rail.

Still according to the invention, for each lower ball guide 72 a second ball stopping element is provided by providing a tab 82*b* protruding from the upper rail wall at the second lower ball guide portion 72*b* towards the center of the lower ball guide 72 at selected locations along the longitudinal axis of said upper rail. To this purpose, one or more grooves 86 are carved into the upper rail wall at the second lower ball guide portion 72*b* at selected locations along the longitudinal axis of said upper rail and one or more tabs 82*b* are fitted into said grooves so as to protrude towards the center of the lower ball guide 72. Analogously, for each upper ball guide 74 a second ball stopping element is provided by providing a tab 84*b* protruding from the upper rail wall at the second upper ball guide portion 74*b* towards the center of the upper ball guide 74 at selected locations along the longitudinal axis of said upper rail. To this purpose, one or more grooves 88 are carved into the upper rail wall at the second upper ball guide portion 74*b* at selected locations along the longitudinal axis of said upper rail and one or more tabs 84*b* are fitted into said grooves so as to protrude towards the center of the upper ball guide 74.

Advantageously, the ball stopping elements 82*a*, 82*b*, 84*a*,84*b* of the sliding device according to the invention have a simple construction, they can be made by an easy and inexpensive process and demanding tolerances are not required.

As mentioned above, each upper rail 30 is constrained to the respective lower rail 20, but it can slide relative thereto. However, such sliding movement has to be limited in the longitudinal direction in order to prevent the upper rail from disengaging from the respective lower rail.

Figure 4A:
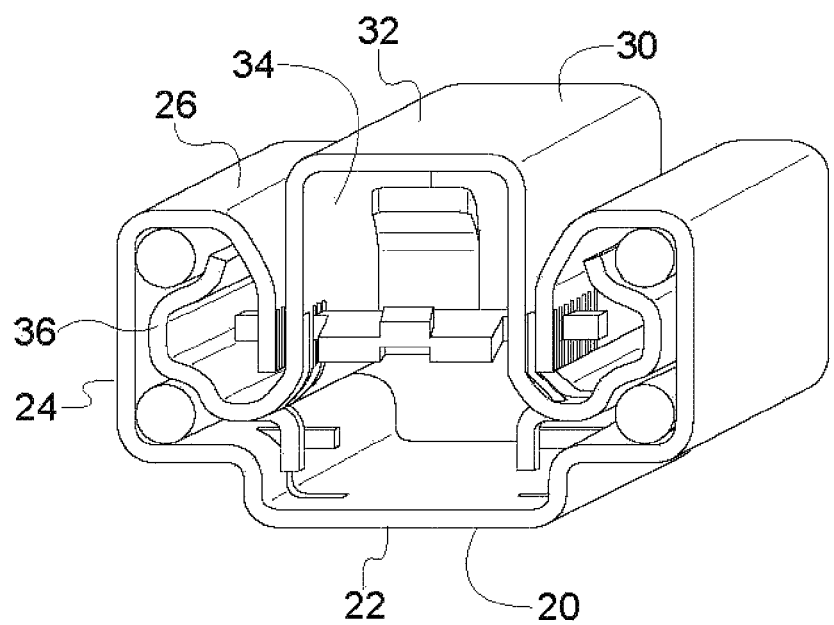
Figure 4B:
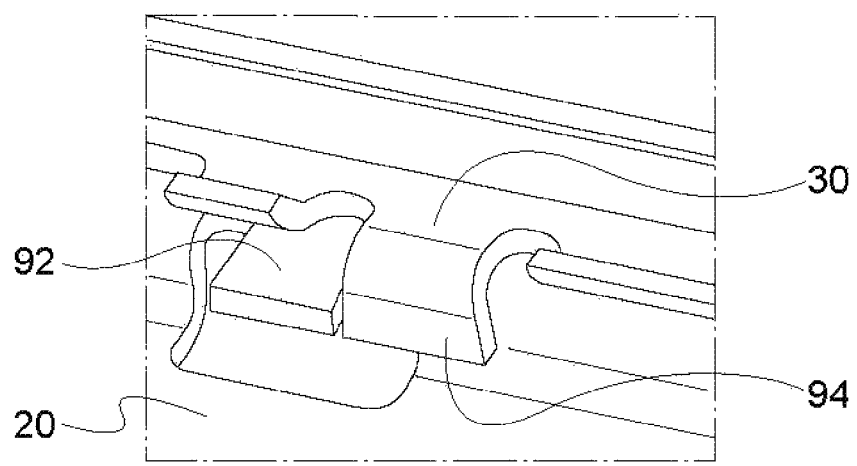

To this purpose, as shown in FIGS. 4*a* and 4*b* end stops 92, 94 are provided for limiting the relative movement of the upper rail 30 relative to the respective lower rail 20.

In detail, on each side of the lower and upper rails a first end stop 92 is provided by cutting and bending a first flap 92 from the wall of the lower rail and a second end stop 94 is provided by cutting and bending a second flap 94 from the wall of the upper rail, the first and second end stops 92, 94 being arranged so that they abut against each other and prevent further movement of the upper rail relative to the respective lower rail.

Figure 4C:
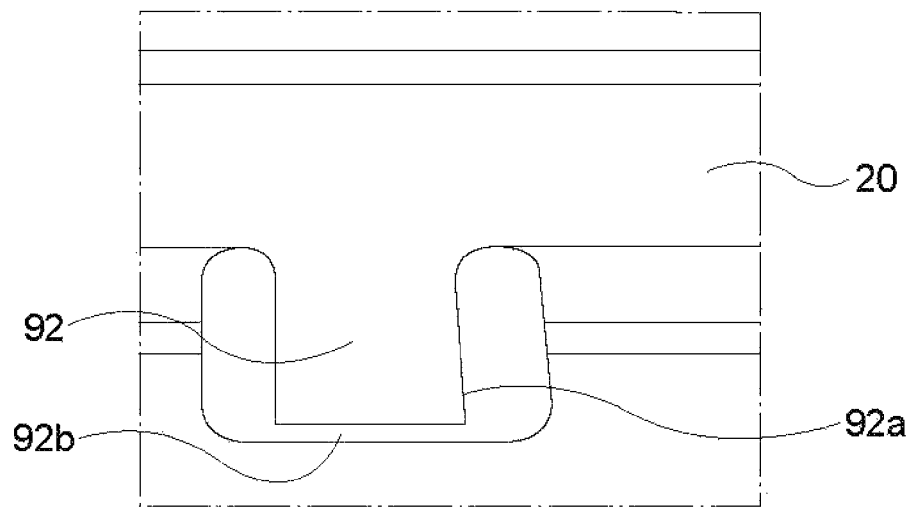
Figure 4D:
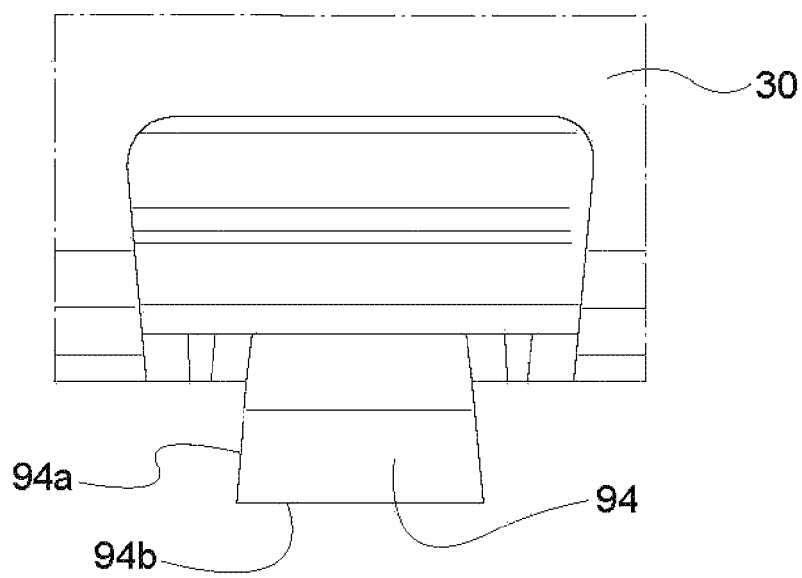

According to the invention and as better shown in FIGS. 4*c* and 4*d*, the first and second end stops are shaped as flared flaps 92, 94, i.e. flaps having a trapezoidal shape, with slightly inclined cooperating sides 92*a*, 94*a* and with the longer bases 92*b*, 94*b* far from the rail wall from which they depart.

The flared shape of the first and second end stops 92, 94 advantageously ensures a positive engagement between said first and second end stops, thus providing a very strong engagement.

Figure 5A:
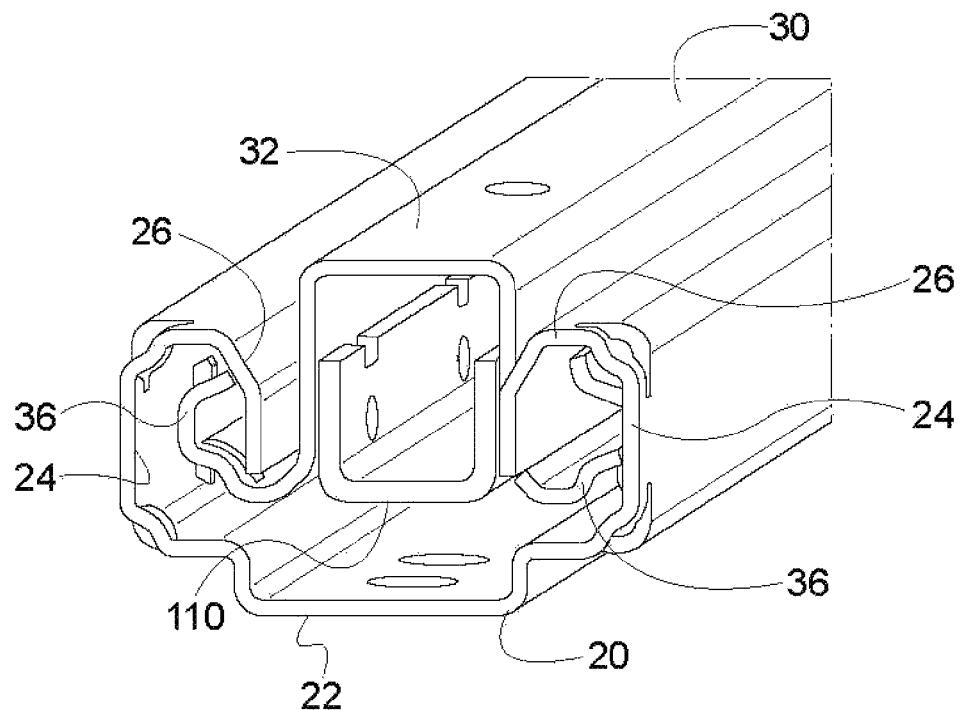
FIG. 5a is a perspective view of a portion of a track of the sliding device of FIG. 1a showing the reinforcement block.
Figure 5B:
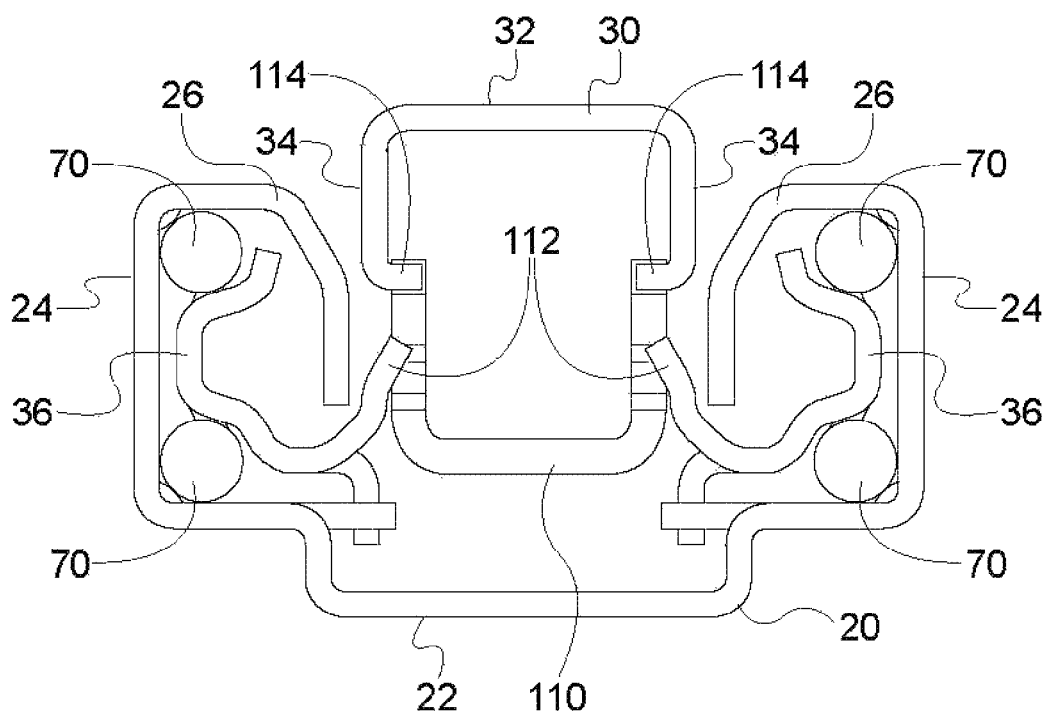

Turning now to FIGS. 5*a* and 5*b*, another advantageous feature of the design of the lower and upper rails of the sliding device 100 of the invention is shown.

FIGS. 5*a* and 5*b* show the reinforcement block 110 which, in a per se known manner is fitted inside the downwardly oriented opening of the upper rail 30 (between the downwardly oriented vertical walls 34 of said upper rail) for preventing bowing and peeling of said upper rail during high crash loads condition and preventing seat collapse.

According to the invention, in order to precisely and firmly fasten said reinforcement block 110 to the respective upper rail 30, the downwardly oriented vertical walls 34 of the upper rail 30 are correspondingly provided with one or more inwardly protruding lugs 112, 114 at selected location along the longitudinal axis of said upper rail.

In the shown embodiment, each vertical wall 34*a* of the upper rail 30 is provided with a lower lug 112 and with upper lug 114.

The facing lower lugs 112 of the vertical walls 34 of the upper rail 30 allow to easily assemble the reinforcement block 110 to the respective upper rail. The facing upper lugs 114 of the vertical walls 34 of the upper rail 30 allow to precisely set the position of said reinforcement block and resist possible transversal movements.

The above description of a preferred embodiment of the invention has been given merely by way of example and several variants and modifications within the reach of the person skilled in the art can be envisaged, without departing from the scope of the invention as defined by the appended claims.

The invention claimed is:

1. A sliding device for a vehicle seat, which sliding device comprises a pair of parallel tracks, each comprising a lower rail, an upper rail, that is slidably constrained to the lower rail, wherein each lower rail has a cross-section having a shape of an upwardly oriented "U" and comprises a lower wall and a pair of parallel, upwardly oriented vertical walls, ending with respective inwardly and downwardly bent flanges, wherein each upper rail has a cross-section having a shape of a downwardly oriented "U" and comprises an upper wall and a pair of parallel, downwardly oriented vertical walls, ending with respective outwardly and upwardly bent flanges, the outwardly and upwardly bent flanges of the upper rail being engaged under the inwardly and downwardly bent flanges of the lower rail, wherein balls are arranged between the lower and upper rails, wherein on each side of the rails a lower ball guide and an upper ball guide for the balls are formed by the lower and upper rails, the lower ball guide being defined by a first lower ball guide portion formed by the lower rail, at a bending joining the lower wall to the respective upwardly oriented vertical wall, and by a second lower ball guide portion formed by the outwardly and upwardly bent flange of the upper rail and the upper ball guide being defined by a first upper ball guide portion formed by the lower rail, at a bending joining the upwardly oriented vertical wall to the respective inwardly and downwardly bent flange, and by a second upper ball guide portion formed by the outwardly and upwardly bent flange of the upper rail, wherein the second lower ball guide portion comprises a straight section and a curved section, the balls in the lower ball guide, during normal operation, contacting the second lower ball guide portion at the straight section of the second lower ball guide portion only, while they are spaced apart from the curved section of the second lower ball guide portion and wherein the second upper ball guide portion comprises a straight section and a curved section, the balls in the upper ball guide, during normal operation, contacting the second upper ball guide portion at the straight section of the second upper ball guide portion only, while they are spaced apart from the curved section of the second upper ball guide portion.

2. The sliding device according to claim 1, wherein the straight section of the second lower ball guide portion is above the curved section of the second lower ball guide portion and the straight section of the second upper ball guide portion is below the curved section of the second upper ball guide portion.

3. The sliding device according to claim 1, wherein a curvature radius of the first lower ball guide portion is substantially equal to a radius of the balls received in the lower ball guide and a curvature radius of the curved section of the second lower ball guide portion is larger than the radius of the balls, and wherein a curvature radius of the first upper ball guide portion is substantially equal to a radius of the balls received in the upper ball guide and a curvature radius of the curved section of the second upper ball guide portion is larger than the radius of the balls.

4. The sliding device according to claim 1, wherein ball stopping elements are provided for limiting movements of the balls along the lower and upper ball guides.

5. The sliding device according to claim 4, wherein, for each lower ball guide, a first ball stopping element is provided by an inward bending of the lower rail wall at the first lower ball guide portion at selected location(s) along a longitudinal axis of the lower rail and, for each upper ball guide, a first ball stopping element is provided by an inward bending of the lower rail wall at the first upper ball guide portion at selected location(s) along the longitudinal axis of the lower rail.

6. The sliding device according to claim 5, wherein, for each lower ball guide, a second ball stopping element is provided by providing a tab protruding from the upper rail wall at the second lower ball guide portion towards a center of the lower ball guide at selected location(s) along a longitudinal axis of the upper rail and, for each upper ball guide, a second ball stopping element is provided by providing a tab protruding from the upper rail wall at the second upper ball guide portion towards a center of the upper ball guide at selected location(s) along the longitudinal axis of the upper rail.

7. The sliding device according to claim 1, wherein end stops are provided for limiting relative movement of the upper rail relative to the lower rail.

8. The sliding device according to claim 7, wherein, on each side of the lower and upper rails a first end stop is provided by a first flap cut and bent from the wall of the lower rail and a second end stop is provided by a second flap cut and bent from the wall of the upper rail, the first and second end stops being arranged so that they can abut against each other and prevent further movement of the upper rail relative to the lower rail.

9. The sliding device according to claim 8, wherein the first and second flaps are shaped as flared flaps.

10. The sliding device according to claim 1, wherein a reinforcement block is fitted between the downwardly oriented vertical walls of the upper rail and wherein the downwardly vertical walls of the upper rail are correspondingly provided with one or more inwardly protruding lugs at selected locations along a longitudinal axis of the upper rail for assembling the reinforcement block to the upper rail.

11. The sliding device according to claim 4, wherein, for each lower ball guide, a first ball stopping element is provided by an inward bending of the lower rail wall at the first lower ball guide portion at selected location(s) along a longitudinal axis of the lower rail.

12. The sliding device according to claim 11, wherein, for each lower ball guide, a second ball stopping element is provided by providing a tab protruding from the upper rail wall at the second lower ball guide portion towards a center of the lower ball guide at selected location(s) along a longitudinal axis of the upper rail.

13. The sliding device according to claim 4, wherein, for each upper ball guide, a first ball stopping element is provided by an inward bending of the lower rail wall at the first upper ball guide portion at selected location(s) along a longitudinal axis of the lower rail.

14. The sliding device according to claim 13, wherein, for each upper ball guide, a second ball stopping element is provided by providing a tab protruding from the upper rail wall at the second upper ball guide portion towards a center of the upper ball guide at selected location(s) along a longitudinal axis of the upper rail.

* * * * *